June 17, 1930.  C. E. BRIDGES  1,764,503
PRESSURE REGULATOR
Filed Aug. 17, 1927
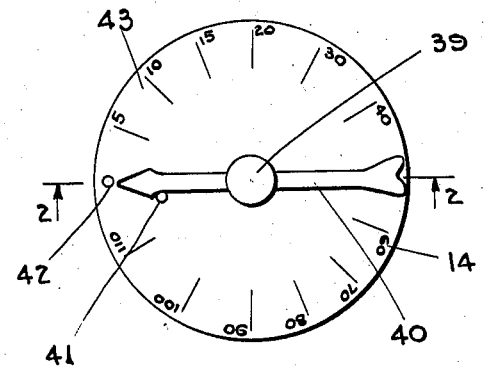
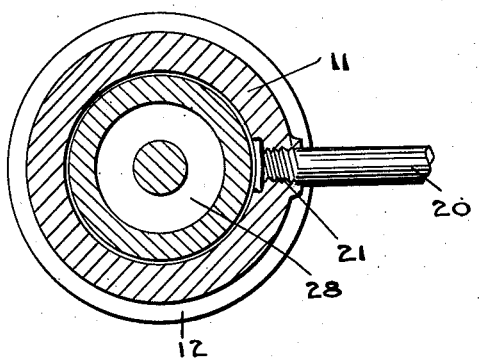
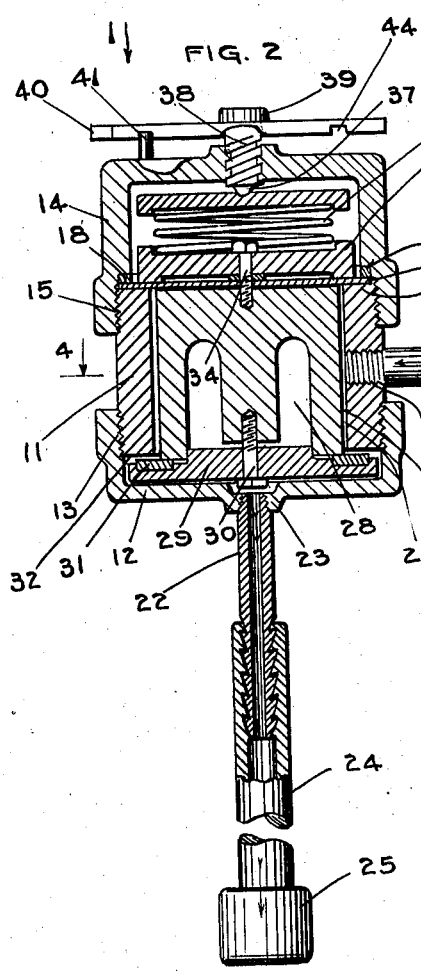
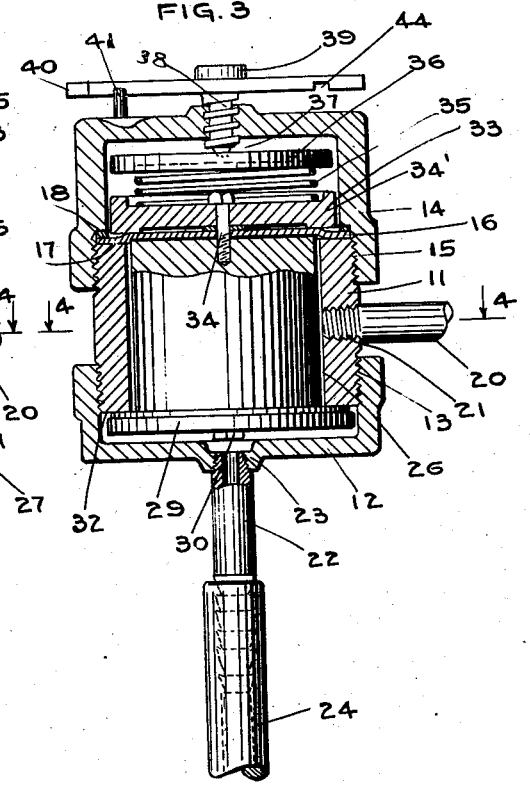
INVENTOR
CHARLES E. BRIDGES
BY Hazard and Miller
ATTORNEYS Patented June 17, 1930

1,764,503

UNITED STATES PATENT OFFICE

CHARLES E. BRIDGES, OF LONG BEACH, CALIFORNIA

PRESSURE REGULATOR

Application filed August 17, 1927. Serial No. 213,522.

My invention is an automatic pressure regulator for use in inflating pneumatic tires and the like.

An object of my invention is the construction of a pressure regulator to be interposed between the source of air supply and a pneumatic tire or the like, this regulator being adjustable to inflate the tire or other article to the desired air pressure, and then automatically shut off the flow of air from the source of supply.

Another object of my invention is the construction of an automatic pressure regulator as above defined in which a pointer operating over a graduated disk is utilized to show the air pressure desired, this pointer having a screw which compresses or releases the compression on the spring in accordance with the desired air pressure indicated.

Another object of my invention in an automatic pressure regulator is to have a block or core which is mounted in a barrel and is floating therein, that is, the air pressure from the source of supply has a tendency to move the block or core one way as much as the other, when the pressure in the tire builds up to such an extent as to shut off the source of supply.

Another object of my invention is operating an automatic pressure regulator by differential air pressure so that a comparatively small pressure in the tires, such as that ordinarily utilized in balloon tires, operating over a large area, compensates a high pressure from the source of supply acting on a small area, whereby the low pressure in the tire may shut off the source of supply and at the same time compress the spring used in connection with the indicating scale.

In constructing my invention I use a cylindrical barrel with caps or cover plates on the top and the bottom. The barrel at one side is connected by a pipe to the source of supply, and the lower cap is connected by means of a tube to an air chuck for connection onto a valve stem or the like. Inside of the barrel I have a core which is slightly longer than the length of the barrel and has disks secured at its opposite ends. The lower disk has a ring type of gasket adapted to bear against the lower end of the barrel and form an air-tight seal. The upper disk is spaced from the core by a rubber or other flexible diaphragm, this diaphragm being held at its outer edge by the upper cover. A spring is mounted in the upper cover bearing on the upper disk and is pressed downwardly by a varying pressure, by means of a coarse threaded screw, this screw having a pointer on the top operating over a dial.

My invention will be more readily understood from the following description and drawings, in which:

Figure 1 is a plan view of my regulator taken in the direction of the arrow 1 of Fig. 2.

Figure 2 is a vertical diametrical section on the line 2—2 of Fig. 1, in the direction of the arrows, showing the regulator in a position for inflating a tire.

Figure 3 is a view similar to Fig. 2 showing part of the internal details of the regulator in elevation.

Figure 4 is a horizontal section taken on the line 4—4 of Figs. 2 or 3.

The fixed structure of my pressure regulator comprises a cylindrical barrel 11 having a low cover 12 connected to the barrel by screw-threads 13. An upper cover 14 is connected to the barrel by screw-threads 15. A resilient diaphragm 16, of any suitable material such as rubber, is retained in position on the upper shoulder 17 of the barrel 11 by a metal ring 18 fitted in an annular groove 19, which is so positioned in the cover 14 that the ring 18 and periphery of the diaphragm 16 are compressed between the cover 14 and shoulder 17 of the barrel.

The air is admitted to the barrel through the infeeding pipe 20 which is screw-threaded into the barrel, as indicated at 21, and the air is fed outwardly through a nipple 22 screw-threaded or otherwise secured in the central part of the lower cover 12. This nipple 22 is connected to a flexible hose 24 which has an air chuck 25 at the end with a check valve therein, this air chuck being suitable for connection to a valve stem of a pneumatic tire or the like.

Mounted internally of the barrel there is a cylindrical core 26 which is slightly smaller in diameter than the internal diameter of the barrel 11, thus leaving an annular air space 27. A plurality of recesses 28 are provided in the core 26 to reduce its weight. A lower disk 29 is connected to the body of the core by a bolt 30 and there is a rubber ring gasket 31 secured between the disk 29 and the body of the core. This ring is adapted to bear against the lower shoulder 32 of the barrel 11 forming an air-tight seal, as hereunder set forth.

An upper disk 33 is secured to the body of the core by a bolt 34 or the like. This disk clamps the diaphragm 16 tightly against the end of the core. The disk has an annular shoulder 34' which carries the pressure directly on the end of the core through the diaphragm and also projects partly over the shoulder 17 on the upper end of the barrel 11.

The regulating mechanism comprises a coiled spring 35 which is seated on the disk 33 and has a plate 36 resting thereon at its upper end. This plate is engaged by the rounded lower end 37 of an adjusting screw 38, this screw having a coarse pitch thread and being connected to a head 39, to which is attached a pointer 40. This pointer is engaged by a stop 41 when the pointer indicates zero, 42, on the scale 43 which is graduated on the top of the cover 14. The rear end of the pointer has a cross groove 44 to allow passage over the top of the stop pin 41.

The manner of operation and functioning of my pressure regulator is substantially as follows:

It is to be understood that the intake pipe 20 when connected to a source of supply will have a greater pressure thereon than any pressure to which a tire is to be inflated, so that the flow will be through the regulator, and the check valve in the air chuck 25 prevents escape of air until this chuck is connected to a valve stem or the like. The pointer 40 may be rotated so that it points to any of the indicia on the scale 43, this being illustrated starting at zero and being graduated in 10 pound stages to 110 pounds, but it is to be understood that other readings may be utilized. The turning of the pointer in a clockwise direction threads the screw 38 further through the cover 14, and this screw, bearing on the plate 36, compresses the spring 35, and the pressure is variable in accordance with the particular pressure indicated by the pointer on the scale.

The pressure of the spring normally forces the core downwardly so that the ring gasket 31 is disengaged from the shoulder 32 at the lower end of the barrel 11, hence when the air pressure in a tire is less than that in the source of supply, the air flows in the pipe 20 around the annular space 27 between the ring gasket 31 and the shoulder 32 and hence underneath the lower disk 29 into the nipple 22, and hence through the hose 24 and the air chuck 25 into the tire. It will be noted that no air can flow upwardly into the chamber in the upper cover 14 containing the spring on account of the diaphragm 16 which forms a complete closure.

When the air pressure in the tire builds up to that for which the pointer is set, this air pressure, acting over a large surface on the lower part of the disk 29, overcomes the higher pressure in the annular space 27 and the pressure of the spring 35, thus moving the core upwardly until the ring 31 bears against the shoulder 32 of the barrel 11; thereby forming an air-tight seal. This action moves the core slightly upwardly carrying the upper disk 33 which distorts or stretches the diaphragm 16 from the flat position of Fig. 2 to the position of Fig. 3. It is the degree of compression of the spring 35 which determines the pressure of the air forced into the tires.

It will be noted that the air pressure in the annular space presses on the diaphragm 16 and on the ring gasket 31 with equal pressures, therefore these compensate. But as the area of pressure from the air in the annular space is so much smaller than the air pressure on the disk 29, the much smaller pressure in the tire can close off the much higher pressure from the source of supply.

While I have indicated a compression spring which is controlled in its pressure by a rotating screw with a pointer thereon, it is to be understood that other means may be utilized for determining the pressure at which the regulator will operate. A characteristic feature, however, of my regulator is the use of a diaphragm which prevents flow of air past the core into the chamber containing the spring and the feature of the core in its upward movement causing a sealing off of the source of air supply.

Various changes may be made in the principles of my invention without departing from the spirit thereof, as set forth in the description, drawings and claims.

I claim:

1. A pressure regulator comprising in combination a tubular barrel having covers on the bottom and the top, said covers having chambers therein, a diaphragm connected across the end of the barrel and under the upper cover, a core slidably mounted in the barrel and having an air space therebetween, an inlet through the barrel into said space, a disk secured on the lower end of the barrel and fitting in the chamber in the lower cover, a ring on the disk and forming a valve closure against the lower end of the barrel, an outlet from the lower cover, a second disk in the chamber in the upper cover and secured to the core through the diaphragm, a spring bearing on said second disk, a screw threaded through the upper cover and operative to compress the spring, and means on the screw outside of the upper cover to operate said screw, said latter means co-operating with indicia on the upper cover to indicate air pressure at which the core operates to close the ring against the barrel.

2. A pressure regulator comprising in combination a tubular barrel, covers secured to the top and bottom thereof, said covers having chambers therein, a resilient diaphragm connected across the top of the barrel between same and the upper cover, a core slidably mounted in the barrel and spaced therefrom, an air inlet to the space so provided, a disk secured to the lower end of the core and having a valve ring adapted to seat against the lower end of the barrel to shut off the said air space, an air outlet from the lower cover, a second disk secured to the core through the diaphragm, a spring bearing on said second disk, a screw threaded through the upper cover having means to bear on the said spring, a pointer mounted on the screw, a scale on the upper cover over which the pointer operates, a stop to limit movement of the pointer, the position of the pointer relative to the scale indicating the pressure in the outlet at which the valve closes by upward movement of the core.

3. A pressure regulator, as claimed in claim 2, the second disk in the upper cover extending over the upper edge of the barrel and limiting the downward movement of the core, there being an air space between the lower cover and the first disk secured to the lower end of the core.

4. A pressure regulator as claimed in claim 2, the diaphragm forming an upper closure for the space between the core and the barrel, and the valve ring forming a lower closure for said space when the valve is shut off, the air pressure upwardly and downwardly on the said discs being equalized when the valve is closed.

In testimony whereof I have signed my name to this specification.

CHARLES E. BRIDGES.